United States Patent
Masuda (10) Patent No.: US 9,826,123 B2
(45) Date of Patent: Nov. 21, 2017

(54) INFORMATION PROCESSING SYSTEM, INFORMATION PROCESSING METHOD, AND RECORDING MEDIUM FOR FACILITATING ASSOCIATION AMONG INFORMATION ITEMS THAT ARE RELATED TO THE SAME DATA

(71) Applicant: Masaya Masuda, Kanagawa (JP)

(72) Inventor: Masaya Masuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/213,667

(22) Filed: Jul. 19, 2016

(65) Prior Publication Data

US 2017/0026549 A1    Jan. 26, 2017

(30) Foreign Application Priority Data

Jul. 21, 2015  (JP) ................ 2015-143727

(51) Int. Cl.
  *H04N 1/44* (2006.01)
  *H04N 1/00* (2006.01)
(52) U.S. Cl.
  CPC ......... *H04N 1/4413* (2013.01); *H04N 1/0023* (2013.01); *H04N 1/00204* (2013.01); *H04N 2201/0094* (2013.01)
(58) Field of Classification Search
  CPC .................................................. H04N 1/4413
  USPC ....................................... 358/1.14
  See application file for complete search history.

(56) References Cited

U.S. PATENT DOCUMENTS 6,446,045 B1 *  9/2002  Stone ............... G06Q 10/00
                                                    705/26.1
2014/0244450 A1  8/2014  Akiyama

FOREIGN PATENT DOCUMENTS

JP    2014-164691    9/2014

* cited by examiner

*Primary Examiner* — Jacky X Zheng
(74) *Attorney, Agent, or Firm* — IPUSA, PLLC (57) ABSTRACT

An information processing system includes a plurality of data processing apparatuses and an information processing apparatus. The information processing apparatus includes a first generation unit configured to generate first identification information, a first storage processing unit configured to store the first identification information, a first reception unit configured to receive second identification information, a first transmission unit configured to add the second identification information, thereby transmitting the first data, and a second storage processing unit configured to store an execution information item. The data processing apparatus includes a second reception unit configured to receive the first data, a second generation unit configured to generate the second identification information, an execution unit configured to perform the process on the first data, and a second transmission unit configured to transmit the first identification information with the execution information item to the information processing apparatus.

7 Claims, 8 Drawing Sheets

| JOB ID |
| --- |
| USER NAME |
| USER INFORMATION |
| PRINT ATTRIBUTE |
| APPLIED RULE ID |
| DATE |
| FILE PATH NAME |
| DELETION FLAG |
| ⋮ |

INFORMATION PROCESSING SYSTEM, INFORMATION PROCESSING METHOD, AND RECORDING MEDIUM FOR FACILITATING ASSOCIATION AMONG INFORMATION ITEMS THAT ARE RELATED TO THE SAME DATA

BACKGROUND OF THE INVENTION

1. Field of the Invention

The present disclosure relates to information processing systems, information processing methods, and recording media.

2. Description of the Related Art

Pull-print is known as a, printing method. In the pull-print, a user transmits printing data to a certain server by using, for example, a Personal Computer (PC). The server stores the printing data. An image forming apparatus acquires (pulls) the printing data from the server to execute a printing job, where the server has been set to be a reference storage (a connection destination) of the image forming apparatus. By using the pull-print, the printing job is executed when the user is near the image forming apparatus. Therefore, it can be prevented that a sheet on which classified information is printed is left, or seen by someone else. Also, by using the pull-print, a plurality of image forming apparatuses, whose reference storage are the same server, can execute printing jobs with respect to the same printing data.

In the pull-print, a subject for performing processes on the printing data is divided into the server and the image forming apparatus. Consequently, information managed by the server and information managed by the image forming apparatus are generated with respect to the same printing data (or printing job). It is difficult to associate both information items in the conventional technology.

For example, even if identification information is allocated to respective printing jobs on a PC-by-PC basis, the identification information may be duplicated among the printing data received by the server from the plurality of PCs because the identification information is made unique only in one PC. Therefore, if the information managed by the server and the information managed by the image forming apparatus are associated based on the identification information, the associated information may not relate to the same printing data.

RELATED ART DOCUMENT

Patent Document

[Patent Document 1]: Japanese Unexamined Patent Application Publication No. 2014-164691

SUMMARY OF THE INVENTION

An object of the present disclosure is to enable association among information items that are related to the same data and separately managed.

The following configuration is adopted to achieve the aforementioned object.

In one aspect of the embodiment of the present disclosure, there is provided an information processing system that includes a plurality of data processing apparatuses and an information processing apparatus for storing data processed by the plurality of data processing apparatuses. The information processing apparatus includes a first generation unit configured to generate first identification information in response to receiving an acquisition request of first data from a data processing apparatus among the plurality of data processing apparatuses, wherein the first identification information is unique to a process corresponding to the received acquisition request, a first storage processing unit configured to store the first identification information associated with a process information item, wherein the process information item relates to the first data and is stored in the information processing apparatus, a first reception unit configured to receive second identification information from the data processing apparatus, wherein the second identification information is generated by the data processing apparatus on a process-by-process basis, and wherein the data processing apparatus transmits the second identification information in response to an acquisition request from the information processing apparatus, a first transmission unit configured to add the second identification information received by the first reception unit to the first data, thereby transmitting the first data to the data processing apparatus, and a second storage processing unit configured to store an execution information item related to the process performed on the first data by the data processing apparatus in response to receiving the execution information item with the first identification information, wherein the stored execution information item is associated with the process information item that is associated with the first identification information. The data processing apparatus includes a second reception unit configured to receive the first data, transmitted from the information processing apparatus, wherein the information processing apparatus transmits the first data in response to the acquisition request of the first data from the data processing apparatus, a second generation unit configured to generate the second identification information in response to the acquisition request of the second identification information from the first reception unit, thereby transmitting the second identification information to the information processing apparatus, wherein the generated second identification information is stored and associated with the first identification information that is received with the acquisition request of the second identification information, an execution unit configured to perform the process on the first data in response to receiving the first data; and a second transmission unit configured to transmit the first identification information, with the execution information item, to the information processing apparatus in response to the execution unit performing the process on the first data, wherein the transmitted first identification information is associated with the second identification information that is added to the first data received from the information processing apparatus.

Other objects, features and advantages of the present disclosure will become apparent from the following detailed description when read in conjunction with the accompanying drawings.

DETAILED DESCRIPTION OF THE PREFERRED EMBODIMENTS

Figure 1:
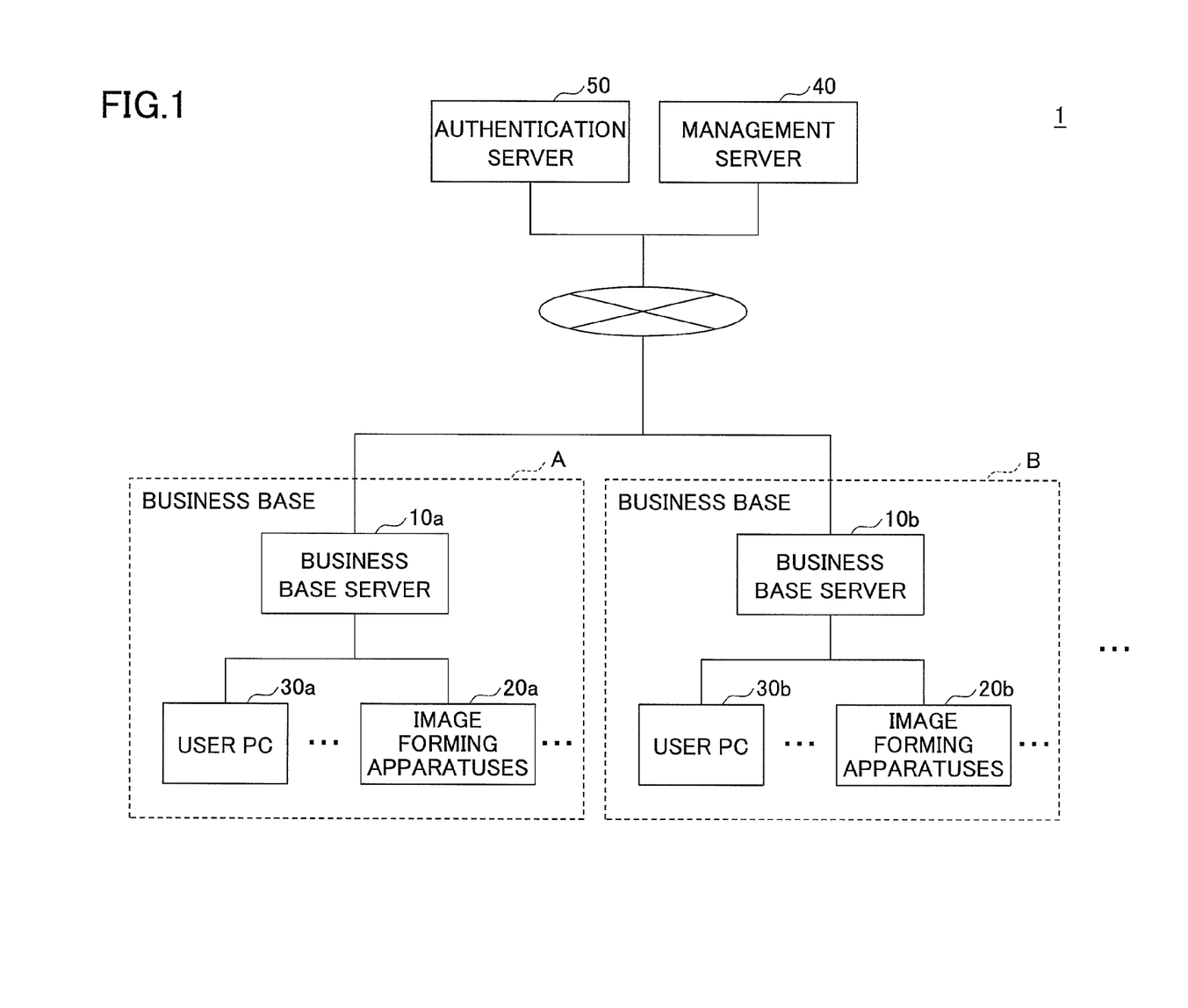
FIG. 1 is a diagram illustrating an example configuration of a print system of an embodiment of the present disclosure.

In the following, embodiments of the present disclosure will be described with reference to accompanying drawings. FIG. 1 is a diagram illustrating an example configuration of a print system of an embodiment.

In the print system 1 illustrated in FIG. 1, for example, business bases including a business base A and a business base B are places for supporting business operation of a company, such as shops and offices. For example, the business base A is an office located in an area A, and the business base B is an office located in an area B. The area A and area B may be located in discrete prefectures or in discrete countries. Also, three or more business bases may be included. Additionally, reference numerals of apparatuses belonging to the business base A includes a suffix "a", while reference numerals of apparatuses belonging to the business base B includes a suffix "b". In a case where an apparatus does no need to be distinguished from an apparatus in another business base, the suffixes "a" or "b" are omitted.

Respective business bases include a business base server 10, one or more user PCs 30, one or more image forming apparatuses 20, and the like. The business base server 10, the user PCs 30 and the image forming apparatuses 20 are connected via a network such as a LAN (Local Area Network) or the internet being capable of communicating each other. That is, the business base servers 10 are respectively associated with discrete image forming apparatuses 20.

For example, the user PCs 30 are PCs (Personal Computers) used by users working in the business bases. In the present embodiment, the user PC 30 transmits printing data to the business base server 10 that belongs to the same business base as the PC 30 belongs to. Additionally, a mobile phone, a smartphone, a tablet terminal, etc., may be used instead of the user PC 30.

The business base server 10 is a computer that receives the printing data transmitted from the user PC 30, and stores the printing data, bibliographic information of the printing data, and the like. In the present embodiment, one business base server 10 is disposed in one business base. However, two or more business base servers 10 may be disposed in one business base. Additionally, in the following, the bibliographic information of the printing data is referred to as "job information".

The image forming apparatus 20 is an apparatus having a print function, such as a multifunction peripheral or a printer. The image forming apparatus 20 transmits an acquisition request of job information and printing data to the business base server 10 belonging to the same business base as the image forming apparatus 20, thereby executing a printing job based on printing data transmitted in response to the acquisition request. That is, address information of the business base server 10 belonging to the same business base as the image forming apparatus 20 is set in the image forming apparatus 20 as an acquisition destination of the job information and the printing data.

Also, in the print system 1, a management server 40 and an authentication server 50 are connected with business base servers 10 respectively belonging to discrete business bases via a network such as a LAN or the internet being capable of communicating each other.

The management server 40 is one or more computers for unitarily managing log information related to the printing job executed by the image forming apparatuses 20 disposed in respective business bases. The authentication server 50 is one or more computers for authenticating a user who is a request source of execution of the printing job.

Additionally, the management server 40 may not be only one. For example, the management server 40 may be provided for every group of business bases, where a certain number of business bases are included in the group. Also, the management server 40 may belong to any of the business bases. For example, the business base server 10 belonging to one of the business bases may also serves as the management server 40.

Figure 2:
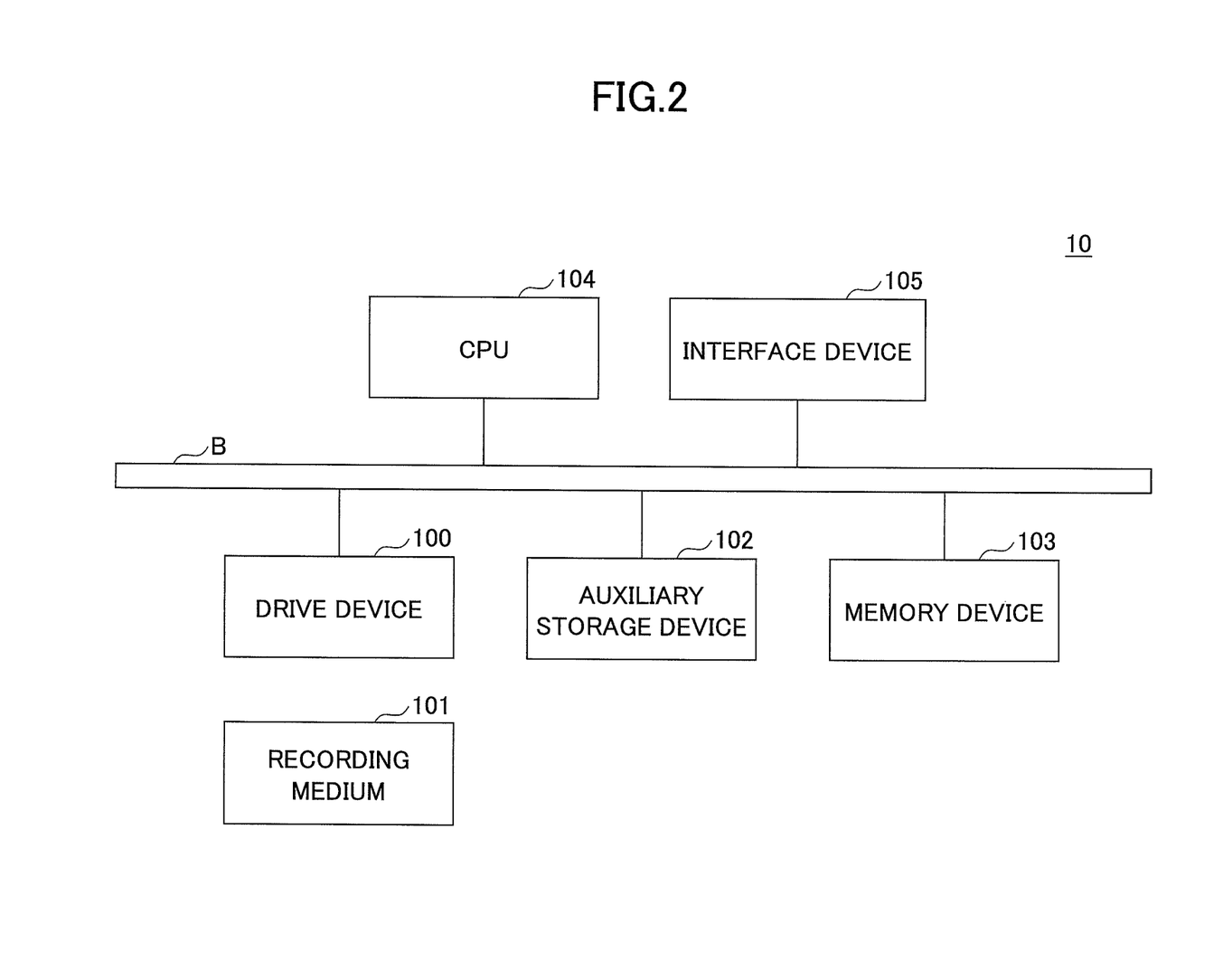
FIG. 2 is a diagram illustrating a hardware configuration of a business base server.

FIG. 2 is a diagram illustrating a hardware configuration of the business base server of the present embodiment. The business base server 10 illustrated in FIG. 2 includes a drive device 100, an auxiliary storage device 102, a memory device 103, a CPU 104, an interface device 105, etc., where the respective elements are connected via a bus B.

A program for achieving processes performed by the business base server 10 is provided via a recording medium 101 such as a CD-ROM. When the recording medium 101 in which the program is recorded is set in the drive device 100, the program is installed from the recording medium 101 into the auxiliary storage device 102 through the drive device 100. However, the program may be installed from somewhere other than the recording medium 101. The program may be downloaded from another computer via the network. The auxiliary storage device 102 stores the installed program, and also stores required files, data, and the like.

The memory device 103 stores the program retrieved from the auxiliary storage device 102 in response to instruction to start executing the program. The CPU 104 performs processes for achieving functions included in the business base server 10 in accordance with the program stored in the memory device 103. The interface device 105 is used as an interface for connecting to the network.

Additionally, each business base server 10 may include a plurality of computers having a configuration illustrated in FIG. 2. Also, the management server 40 may have a similar configuration to that of the business base server 10.

Figure 3:
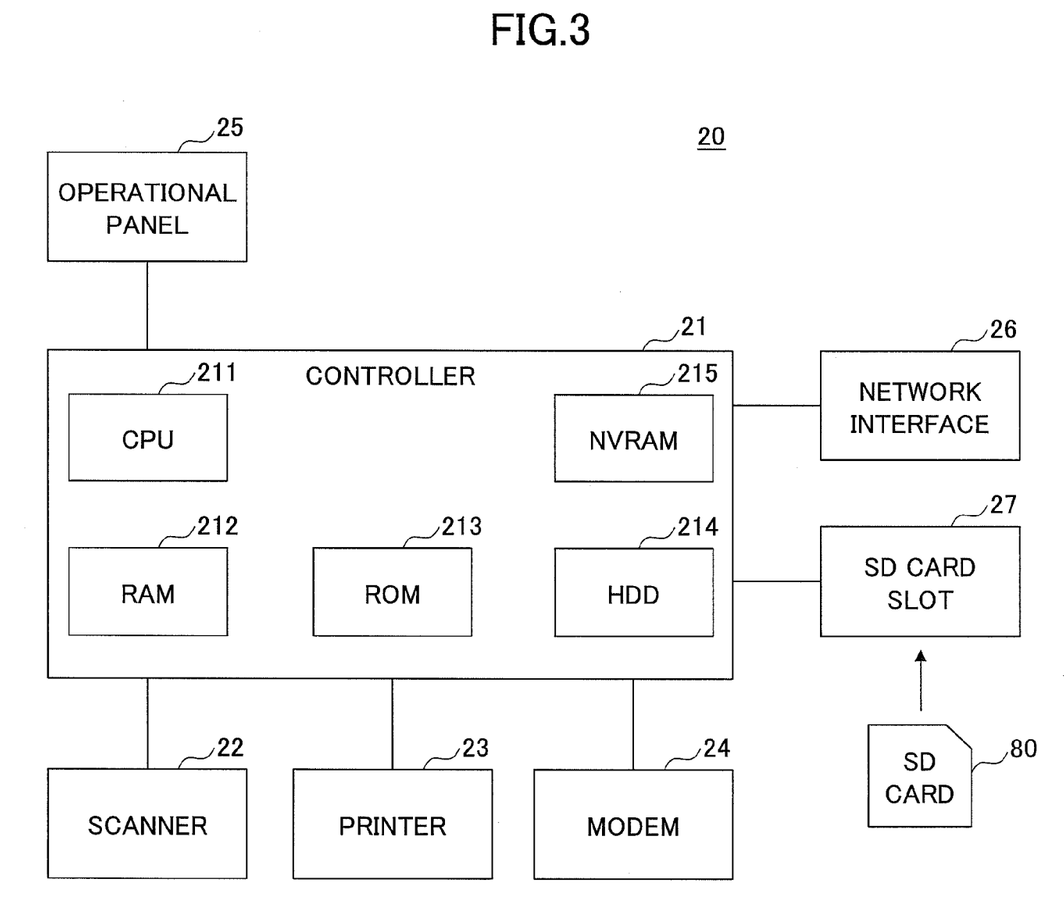
FIG. 3 is a diagram illustrating a hardware configuration of an image forming apparatus.

FIG. 3 is a diagram illustrating a hardware configuration of the image forming apparatus of the present embodiment. In FIG. 3, the image forming apparatus 20 includes a controller 21, a scanner 22, a printer 23, a modem 24, an operational panel 25, a network interface 26, a SD card slot 27, and the like.

The controller 21 includes a CPU 211, a RAM 212, a ROM 213, a HDD 214, a NVRAM 215, and the like. The ROM 213 stores programs, data that is used in the programs, and the like. The RAM 212 is used as a memory area into which the program is loaded, or a work area for the loaded program. The CPU 211 achieves functions by executing the program loaded in the RAM 212. The HDD 214 stores programs and data used by the programs. The NVRAM 215 stores setting information, and the like.

The scanner 22 is hardware (image reading unit) for scanning image data from a document. The printer 23 is a hardware (print unit) for performing print operation based on the printing data on a printing sheet. The modem 24 is hardware for connecting to telephone network, which is used for performing transmission/reception of image data through a FAX communication. The operational panel 25 is hardware including an input unit such as buttons for accepting user's operation, a display unit such as a liquid crystal display (LCD), and the like. The LCD may have a touch panel function. In such a case, the LCD also serves as an input unit. The network interface 26 is hardware for connecting to a network such as a LAN (wired or wireless). The SD card slot 27 is used for retrieving the program stored in the SD card 80. That is, in the image forming apparatus 20, not only the program stored in the ROM 213, but also the program stored in the SD card 80 can be loaded into the RAM 212 to be executed. Additionally, other recording media (e.g., CD-ROM, USB (Universal Serial Bus), etc.) may be used instead of the SD card 80. That is, type of the recording medium corresponding to the SD card 80 is not limited. In this case, hardware corresponding to the type of the recording medium may be provided instead of the SD card slot 27.

Figure 4:
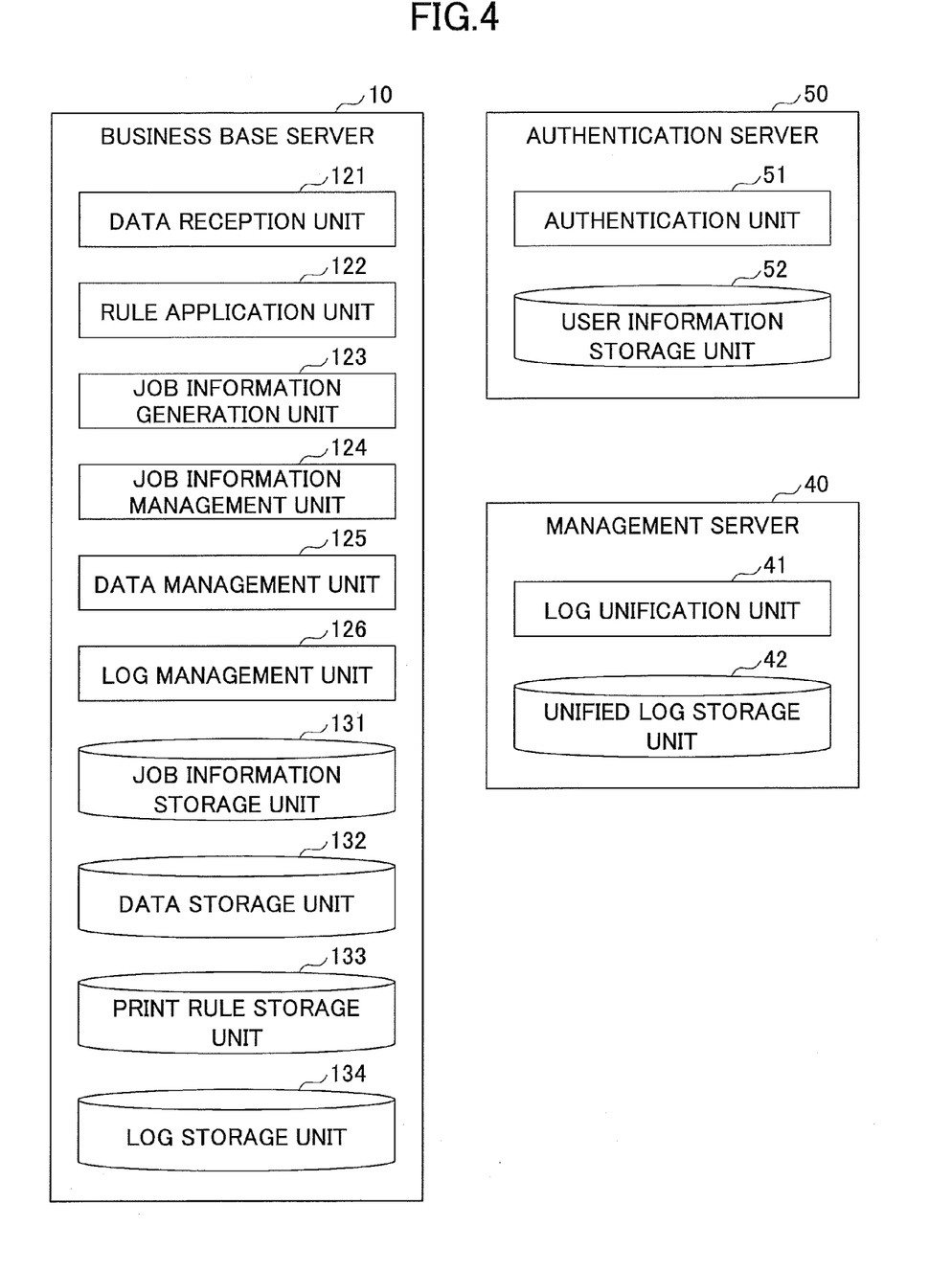
FIG. 4 is a diagram illustrating example functional configurations of the business base server, an authentication server, and a management server.

FIG. 4 is a diagram illustrating example functional configurations of the business base server, the authentication server, and the management server. In FIG. 4, the authentication server 50 includes an authentication unit 51. The authentication unit 51 is achieved by processes performed by the CPU included in the authentication server 50 in accordance with one or more programs installed in the authentication server 50. The authentication server 50 uses a user information storage unit 52. The user information storage unit 52 can be achieved by an auxiliary storage device of the authentication server 50 or a storage device that can be connected to the authentication server 50 via the network.

In response to an authentication request transmitted from the business base server 10 or the image forming apparatus 20, the authentication unit 51 performs authentication of user name and password included in the authentication request. The authentication is performed by comparing the user name and password included in the authentication request with user name and password stored in the user information storage unit 52. In the user information storage unit 52, the user name and password, a charge code, attribute information (department name, e-mail address, etc.) related to a user (hereinafter referred to as "user information") who has been authorized to use the print system 1, and the like, are recorded, where the respective items described above are recorded on a user-by-user basis. The charge code is identification information indicating type of usage of the image forming apparatus 20, where the types are associated with respective business operations. Also, the types may be associated with departments, projects related to the user. Therefore, the charge code may be identification information of a department or a project to which the user belongs. For example, a management code is used as identification information for determining charging destination related to usage of functions of the image forming apparatus 20 (job execution).

Meanwhile, the business base server 10 includes a data reception unit 121, a rule application unit 122, a job information generation unit 123, a job information management unit 124, a data management unit 125, a log management unit 126, and the like. The respective units are achieved by processes performed by the CPU 104 in accordance with the one or more programs installed in the business base server 10. The business base server 10 also includes a job information storage unit 131, a data storage unit 132, a print rule storage unit 133, a log storage unit 132, and the like. For example, the respective storage units can be achieved by the auxiliary storage device 102. Or, the respective storage units may be achieved by a storage device connected to the business base server 10 via the network.

In response to receiving printing data from the user PC 30, the data reception unit 121 requests the authentication server 50 to perform the authentication of the user of the user PC 30 that has transmitted the printing data, and receives the authentication result from the authentication server 50. For example, the data reception unit 121 receives user name and password of the user of the user PC 30 in addition to the printing data, where the user name and password may be included in the printing data. The data reception unit 121 requests the authentication server 50 to perform the authentication of the user name and password. In a case of successful authentication, the user information of the authenticated user is included in the authentication result received form the authentication server 50.

The rule application unit 122 determines a print rule for the printing job among print rules stored in the print rule storage unit 133, thereby applying the determined print rule to the printing data. The print rule means a rule to be applied to a printing job based on the printing data, which includes a conditional equation and a process to be performed upon the conditional equation being satisfied. For example, the conditional equation is an equation expressing condition with respect to values of items constituting the user information, or values of items constituting print attribute included in the printing data. For example, "department=AAA", "number of pages >20", etc., are set as the conditional equations. For example, the process to be performed upon the conditional equation being satisfied is a forced change of the print attribute. For example, change into monochrome print, change into double face print or aggregation print, etc., are exemplified as the forced change of the print attribute.

The job information generation unit 123 analyzes the printing data to generate job information related to the printing data. The job information generation unit 123 stores the printing data in the data storage unit 132, and also stores the generated job information associated with the printing data in the job information storage unit 131.

In response to receiving, from the image forming apparatus 20, an acquisition request of a list of job information (hereinafter referred to as "job list") related to user logged-in the image forming apparatus 20, the job information management unit 124 acquires the job information including the user name that is included in the acquisition request from the job information storage unit 131. The job information management unit 124 transmits the job list consisting of the acquired job information items to the image forming apparatus 20 that is the request source of the acquisition request. In response to an acquisition request of printing data related to a job information item selected from the job list, the data management unit 125 acquires the printing data from the data storage unit 132. The data management unit 125 transmits the acquired printing data to the image forming apparatus 20 that is the request source of the acquisition request.

The log management unit 126 stores log information related to printing data to be processed by the image forming apparatus 20 selected from printing data stored in the data storage unit 132. For example, job information of the printing data, etc., are included in the log information.

The management server 40 includes a log unification unit 41. The log unification unit 41 is achieved by processes performed by the CPU of the management server 40 in accordance with the one or more programs installed in the management server 40. The management server 40 uses a unified log storage unit 42. The unified log storage unit 42 can be achieved by the auxiliary storage device of the management server 40, or a storage unit that can be connected to the management server 40 via the network.

The log unification unit 41 receives, from the business base server 10, log information related to the printing datum to be processed in the image forming apparatus 20 selected from printing data stored in the data storage unit 132 of the business base server 10, and also receives, from the image forming apparatus 20, log information related to processes having performed with respect to the printing data in the image forming apparatus 20. The log unification unit 41 associates the log information received from the business base server 10 with the log information received from the image forming apparatus 20 based on identity of related printing data. The associated log information is stored in the unified log storage unit 42.

Figure 5:
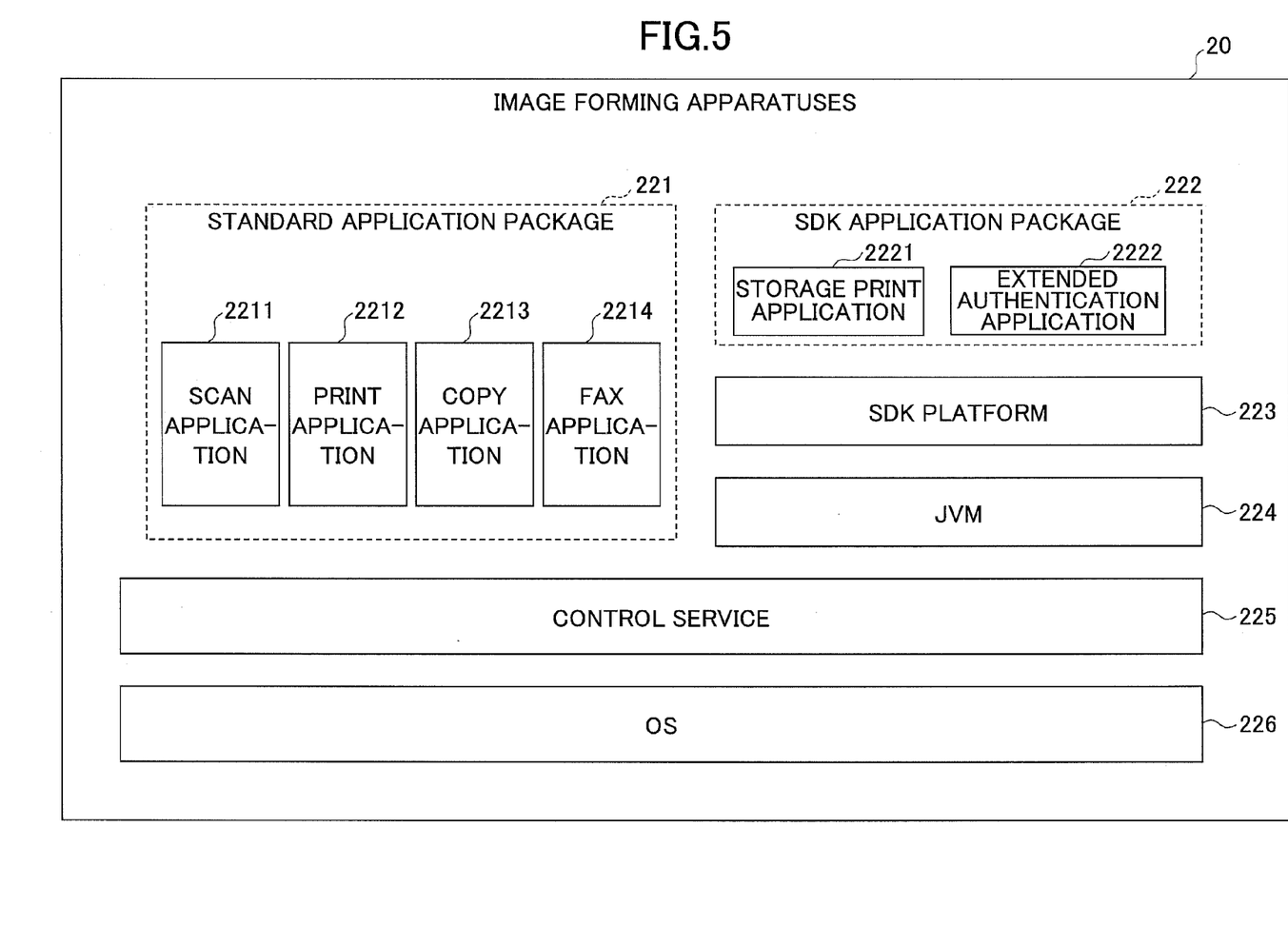
FIG. 5 is a diagram illustrating an example software configuration of the image forming apparatus.

FIG. 5 is a diagram illustrating an example software configuration of the image forming apparatus of the present embodiment. In FIG. 5, the image forming apparatus 20 includes standard application package 221, a SDK application package 222, a SDK platform 223, JVM 224, a control service 225, an OS 226, and the like.

The standard application package 221 is a set of application programs which are normally installed (at time of shipment) in the image forming apparatus 20. In FIG. 5, a scan application 2211, a print application 2212, a copy application 2213, a FAX application 2214 are illustrated as example application programs included in the standard application package 221. The scan application 2211 executes a scan job using the scanner 22, and the like. The print application 2212 executes a printing job of printing data using the printer 23, etc., in response to the printing data being received at a predetermined port. The copy application 2213 executes a copy job using the scanner 22, the printer 23, and the like. The FAX application 2214 executes a FAX transmission job or a reception job using the modem 24, and the like.

The control service 225 is a set of software modules for providing functions for controlling hardware resources or functions common to respective application programs with high order programs such as the standard application package 221 and the SDK platform 223. For example, the control service 225 has a function related to network communication, a function for controlling the scanner 22, a function for controlling the printer 23, a function for managing the memory, a function of authentication, and the like.

The SDK application package 222 is one or more application programs (may be referred to as plug-in) for expanding functions of the image forming apparatus 20, which are additionally installed after the shipment of the image forming apparatus 20. In FIG. 5, a storage print application 2221 and an extended authentication application 2222 are illustrated as example application programs included in the SDK application package 222. The storage print application 2221 of the SDK application package 222 is provided for achieving a printing method referred to as storage print or pull-print, and the like. That is, the storage print application 2221 controls execution of printing job regarding the printing data that is transmitted from the user PC 30 to the business base server 10 and stored therein. Additionally, the print application 2221 included in the standard application package 221 is basically designed to execute the printing job regarding the printing data that is transmitted from the user PC 30 to the predetermined port of the image forming apparatus 20. Therefore, the storage print or pull-print cannot be performed with the print application 2221.

The extended authentication application 2222 of the SDK application package 222 is provided for performing user authentication in conjunction with an external authentication apparatus (in this embodiment, authentication server 50). Additionally, although the control service 225 has a function of authentication, the function does not support a process required in the present embodiment. Therefore, the extended authentication application 2222 is used in the present embodiment.

Additionally, the SDK application package 222 may include one or more application programs other than the storage print application 2221 and the extended authentication application 2222.

The SDK platform 223 includes an API (Application Program Interface) for developing application program included in the SDK application package 222, and provides execution environment of the application program included in the SDK application package 222. For example, the API may be a function, a class defined in object oriented manner, a method of the class, and the like. In the present embodiment, the API is achieved by a group of classes in JAVA. In the following, the API provided by the SDK platform 223 is referred to as "SDKAPI". For example, the SDK platform 223 provides SDKAPIs related to scanning function and printing function, SDKAPI related to copying function, etc., with the SDK application package 222. The SDKAPI is published, and a third vender can develop the application program included in the SDK application package 222.

The JVM 224 is VM (Virtual Machine) of JAVA. The SDK application package 222 is installed as JAVA application in the present embodiment. The SDK application package 222, the SDK platform 223, etc., can use the API provided by a standard classes of JAVA included in the JVM 224.

The OS 226 is an OS (Operating System). Software of the image forming apparatus 20 operates as a process or a thread in the OS 226.

Figure 6:
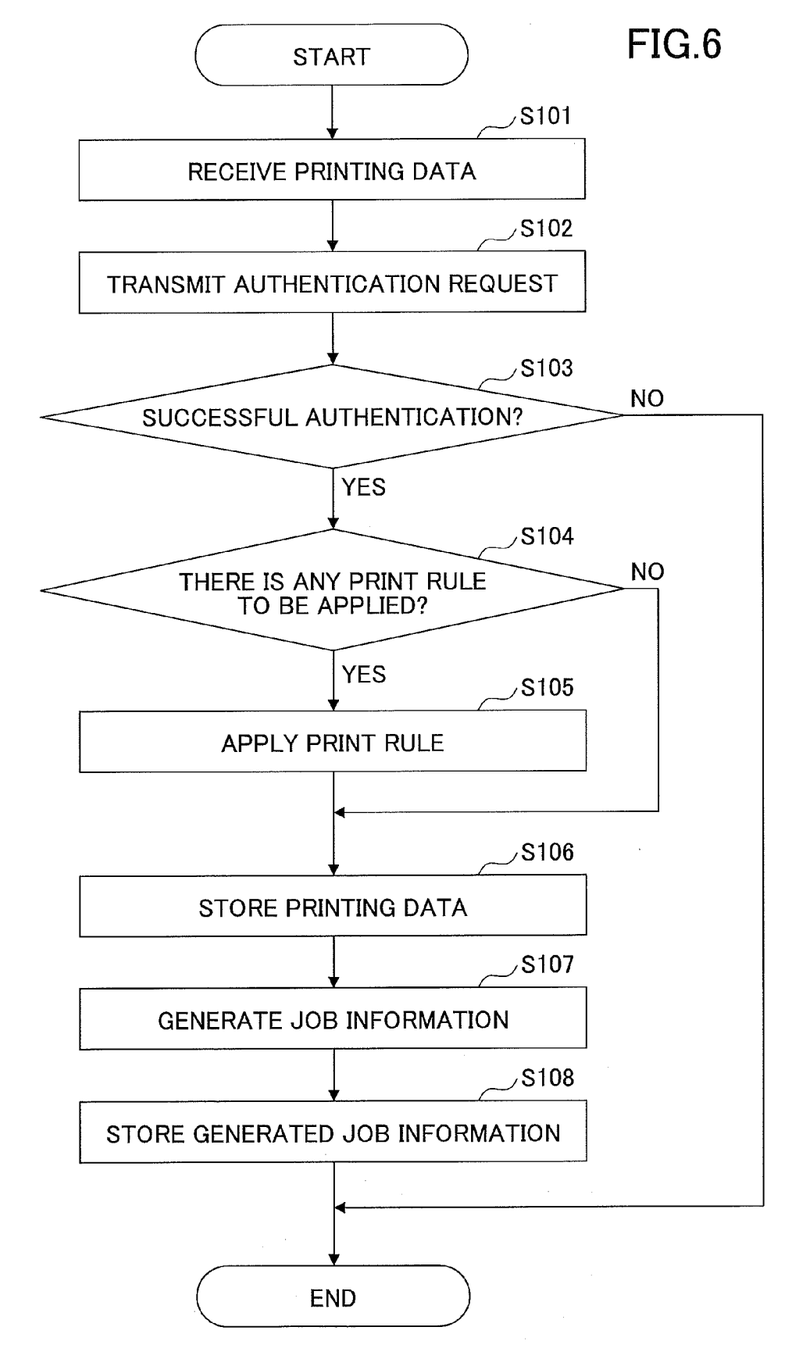
FIG. 6 is a flowchart illustrating a process performed by the business base server in response to receiving printing data.

In the following, a process performed in the print system 1 will be described. FIG. 6 is a flowchart illustrating a process performed by the business base server 10 in response to receiving the printing data. For convenience of explanation, FIG. 6 illustrates the process regarding the business base A. In a case where the process illustrated in FIG. 6 regarding another business base is performed, the PC 30 and the business base server 10a described below are replaced with those of the other business base.

In step S101, the data reception unit 121 of the business base server 10a receives printing data transmitted from any of the user PCs 30a. The data reception unit 121 transmits an authentication request including user name and password received with the printing data or included in the printing data to the authentication server 50 (step S102). Additionally, for example, the user of the user PC 30a may input user name and password through a screen for setting print attribute (print condition) when performing printing operation. The user name and password input in this way may be received in step S101.

The authentication unit 51 of the authentication server 50 performs the authentication by determining whether a record including the user name and password is stored in the user information storage unit 52. That is, the authentication unit 51 determines that the authentication is successfully performed in a case where the record is stored in the user information storage unit 52. In a case of successful authentication, the authentication unit 51 transmits a response including the user information included in the record to the business base server 10*a*. On the other hand, in a case of authentication failure, the authentication unit 51 transmits a response including information indicating the authentication failure to the business base server 10*a*.

In a case where the response from the authentication server 50 indicates authentication failure (No in step S103), the data reception unit 121 of the business base server 10*a* terminates the process illustrated in FIG. 6. On the other hand, in a case where the response from the authentication server 50 includes the user information (Yes in step S103), the rule application unit 122 determines whether there is any print rule to be applied to the printing data (step S104). For example, when the user information obtained through the successful authentication, the print attribute included in the printing data, etc., satisfies a conditional equation of any of print rules stored in the print rule storage unit 133, the rule corresponding to the satisfied conditional equation is determined to be applied.

In a case where there is any print rule to be applied (Yes in step S104), the rule application unit 122 applies the rule to the printing data (step S105). For example, the print attribute of the printing data is forced to be changed. On the other hand, in a case where there is no print rule to be applied (No in step S104), the process of step S105 is not performed.

Figure 7:
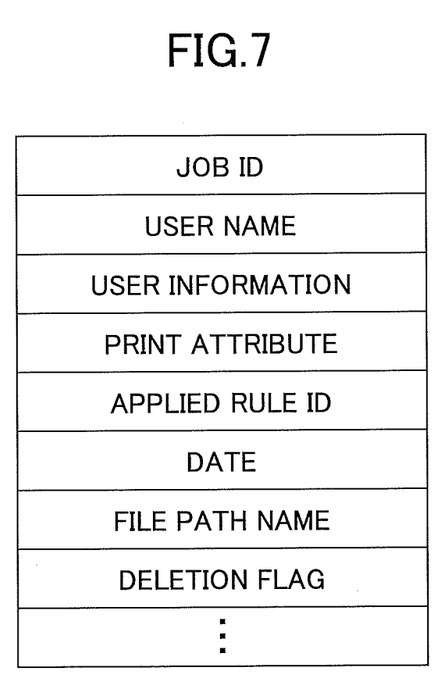
FIG. 7 is a diagram illustrating an example configuration of job information.

The job information generation unit 123 stores the printing data in the data storage unit 132 (step S106). For example, the printing data is included in a file to be stored. The job information generation unit 123 generates job information related to the printing data (step S107). FIG. 7 is a diagram illustrating an example configuration of the job information. In FIG. 7, the job information includes a job ID, a user name, user information, print attribute, an applied rule ID, a date, a file path name, a deletion flag, and the like.

The job ID is identification information allocated to every printing job. For example, the job ID may be given to the printing data by the user PC 30*a*. The user name is received with the printing data. The user information is obtained through the successful authentication. The charge code is included in the user information. The print attribute is extracted from the printing data. The applied rule ID is identification information of a print rule which is determined to be applied to the printing data. The date indicates a date when the printing job is generated. The file path name is path name of the file in which the printing data is included and stored in step S106. The deletion flag is information indicating whether to automatically delete the job information in response to executing the printing job regarding the printing data, where the flag information indicates "True" or "False". The deletion flag may be set by the user PC 30 when inputting print instruction, or may be set by the business base server 10*a*.

The job information generation unit 123 stores the generated job information in the job information storage unit 131 (step S108). In the present embodiment, the association of the printing data with the job information is achieved by the file path name included in the job information. However, the printing data may be associated with the job information by other means.

In the following, a process performed when the printing job regarding the printing data stored in the business base server 10 is executed will be described.

Figure 8:
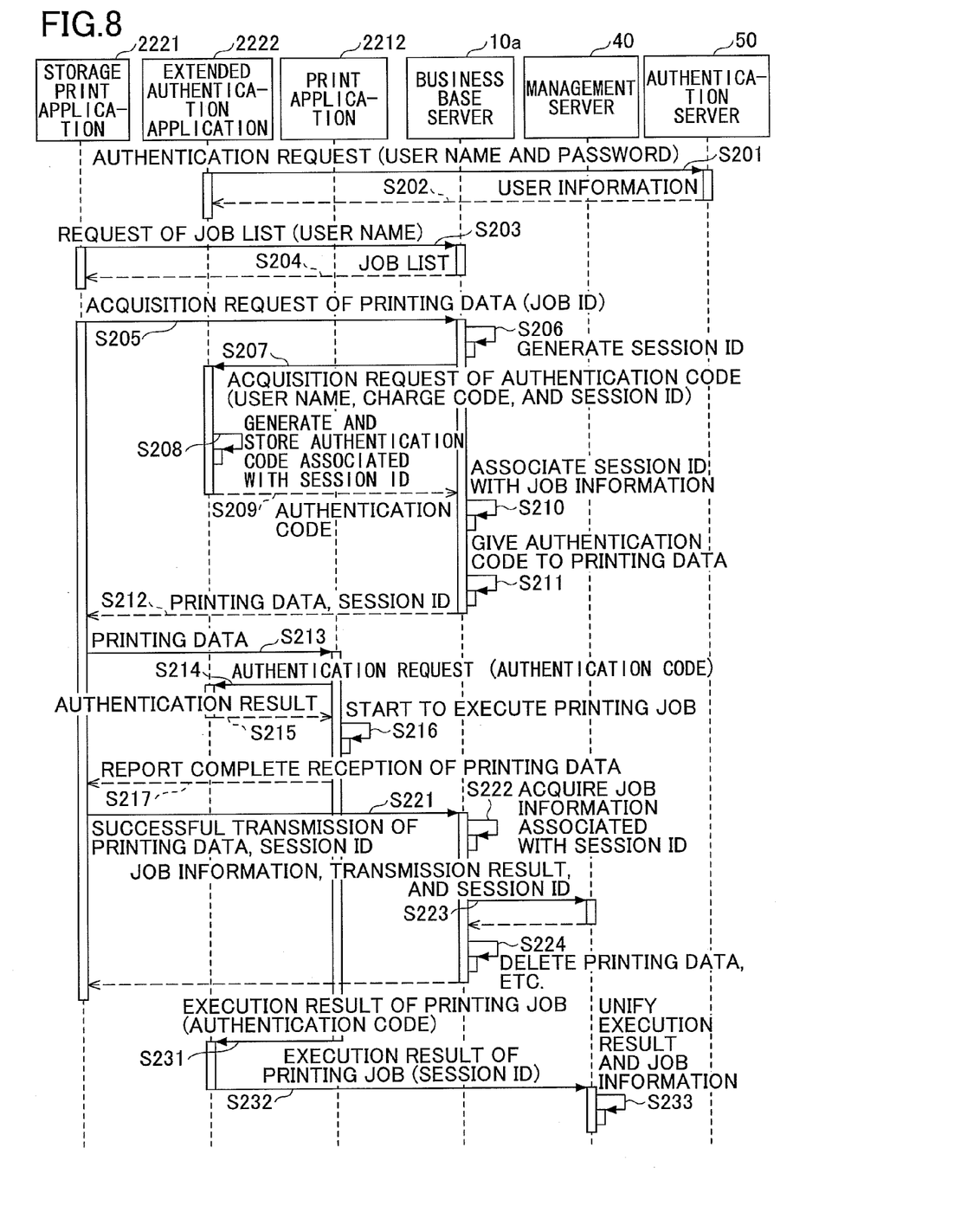
FIG. 8 is a sequence diagram illustrating an example process performed when printing job is executed.

FIG. 8 is a sequence diagram illustrating an example process performed when the printing job is executed. In FIG. 8, the user operates any of the image forming apparatuses 20*a*. Also, at start of the process illustrated in FIG. 8, a log-in screen is displayed on the operational panel 25 of the image forming apparatus 20*a* to be operated.

In response to the user inputting user name and password through the log-in screen, the extended authentication application 2222 of the image forming apparatus 20*a* transmits an authentication request including the user name and password to the authentication server 50 (step S201). The authentication unit 51 of the authentication server 50 authenticates the user name and password with reference to the user information storage unit 52. In a case of successful authentication, the authentication unit 51 transmits a response including user information corresponding to the user name to the extended authentication application 2222 (step S202).

Upon receiving the response including the user information, the extended authentication application 2222 stores the user information in the RAM 212. Also, the extended authentication application 2222 sets the successfully authenticated user name in the control service 225 through the SDK platform 223 to be the user name of logged-in user. Consequently, respective application programs operated in the image forming apparatus 20*a* can know the user name of logged-in user by inquiring the user name to the control service 225. Also, the extended authentication application 2222 erases the log-in screen. When the log-in screen is erased, the user can use the functions (applications) of the image forming apparatus 20*a*.

In response to the user inputting an instruction to use the storage print application 2221, the storage print application 2221 transmits a request of job list including the user name of logged-in user to the business base server 10*a* (step S203). Additionally, for example, the storage print application 2221 acquires the user name of logged-in user set in the control service 225 through the SDK platform 223. Also, in respective image forming apparatuses 20*a*, an IP address of the business base server 10*a* is set in advance.

Upon the job information management unit 124 of the business base server 10*a* receiving the request, the job information management unit 124 acquires the job information items including the user name from the job information storage unit 131, where the user name is included in the request. Then, the job information management unit 124 transmits the job list consisting of the acquired job information items to the storage print application 2221 (step S204). The storage print application 2221 displays a job selection screen including the job list on the operational panel 25.

In response to the user selecting any of the job information items in the job selection screen, the storage print application 2221 transmits an acquisition request of printing data including a job ID (hereinafter referred to as "object job ID") of the selected job information to the business base server 10*a* (step S205).

Upon receiving the acquisition request, the data management unit 125 of the business base server 10*a* generates a session ID for the printing data to be acquired based on the acquisition request (step S206). That is, the session ID is identification information generated with respect to every printing job regarding the printing data, uniqueness of the session ID is ensured within one business base server 10. Therefore, another session ID is generated when an acquisition request of printing data is received from another image forming apparatus 20*a* in the business base A.

Then, the data management unit 125 transmits an acquisition request of authentication code, which includes the user name, the charge code, and the generated session ID, to the extended authentication application 2222 of the image forming apparatus 20a that is the request source of the acquisition request of printing data (step S207). Here, the user name and the charge code included in the acquisition request are acquired from the job information (hereinafter referred to as "object job information") of the object job ID received in step S205. Also, the user name and the charge code may be transmitted from the storage print application 2221 in step S205. In this case, the storage print application 2221 may inquire the charge code to the extended authentication application 2222.

Upon receiving the acquisition request of authentication code, the extended authentication application 2222 generates the authentication code, and stores the generated authentication code associated with the session ID received with the acquisition request in e.g., RAM 212 (step S208). Then, the extended authentication application 2222 transmits the generated authentication code to the data management unit 125 that has transmitted the acquisition request of the authentication code (step S209). Additionally, the authentication code is identification information generated on a printing job-by-printing job basis, and is used for determining validity of the printing data. A method for generating the authentication code is not limited. For example, the authentication code may be generated using at least any one of the user name, the charge code, and the session ID included in the acquisition request of the authentication code. Also, the extended authentication application 2222 may generate the authentication code in the only event that the user name and the charge code included in the acquisition request are the same as those of the logged-in user of the image forming apparatus 20a stored in the RAM 212.

Upon receiving the authentication code, the data management unit 125 of the business base server 10a associates the session ID generated in step S206 with the object job information stored in the job information storage unit 131 (step S210). For example, a session ID may be added to the object job information.

Then, the data management unit 125 acquires the printing data (hereinafter referred to as object data) identified by the file path name included in the object job information from the data storage unit 132, and gives the authentication code received in step S209 to the object data (step S211). For example, the authentication code is embedded in the object data. The object data in which the authentication code is embedded and the session ID generated in step S206 are transmitted to the storage print application 2221 that has transmitted the acquisition request of the printing data (step S212).

Upon receiving the object data and the session ID, the storage print application 2221, for example, transmits the object data to a predetermined port opened by the print application 2212 through socket communication in the image forming apparatus 20a (step S213). Additionally, the predetermined port also becomes a destination when the user PC 30 directly transmits the printing data to the image forming apparatus 20a. That is, the print application 2212 included in the standard application package 221 does not expect that the storage print application 2221 included in the SDK application package 222 is provided. Therefore, the storage print application 2221 inputs the printing data to the print application 2212 by using an interface (that is, a port for receiving printing data from the user PC 30) already included in the print application 2212. Additionally, by embedding the authentication code in the printing data, the authentication code can be input with the printing data to the print application 2212 through the port.

Upon receiving the printing data, the print application 2212 extracts the authentication code from the printing data, thereby requesting the extended authentication application 2222 to authenticate the authentication code (step S214). Additionally, the print application 2212 does not expect the extended authentication application 2222 included in the SDK application package 222 either. However, authentication function of the control service 225 is expected to be extended in advance because the authentication is one of basic functions while the authentication is likely to be performed in different manner in accordance with customers who use the image forming apparatus 20. Specifically, although a normal authentication function is provided by the control service 225, an application program having an extended authentication function (in this case, extended authentication application 2222) transmits, at starting the application program (normally same as start timing of the image forming apparatus 20), a notification to the control service 225, where the notification is to declare that the application program performs the authentication instead. To be exact, the notification from the extended authentication application 2222 included in the SDK application package 222 is transmitted via the SDK platform 223. Upon receiving the notification from the SDK platform 223, the control service 225 recognizes that the authentication function is provided by the SDK platform 223. Therefore, in a case where the control service 225 accepts a request related to the authentication after the reception of the notification, the control service 225 forwards the request to the SDK platform 223. Further, the SDK platform 223 forwards the request to the application program (in this case, extended authentication application 2222) included in the SDK application package 222 that has transmitted the notification to perform the authentication. Therefore, in view of print application 2212, the authentication request of the authentication code in step S214 is transmitted to the storage print application 2221 by calling an API of the control service 225. Additionally, the authentication process performed in step S201 is also performed by the extended authentication application 2222 in this way. That is, the authentication request of the user name and password input in the log-in screen is transmitted to the extended authentication application 2222 via the control service 225 and the SDK platform 223.

Upon receiving the authentication request of the authentication code, the extended authentication application 2222 authenticates the authentication code by determining whether the authentication code included in the authentication request is the same as the authentication code stored in step S208. That is, in a case where the authentication code included in the authentication request is the same as the authentication code associated with the session ID and stored in step S208, the authentication is performed successfully. The authentication result is reverted to the print application 2212 via a reversed path of the authentication request (step S215). In a case where the authentication result indicating authentication failure is received, the print application 2212 refuses execution of the printing job. In this case, processes after step S217 are not performed. In contrast, in a case where the authentication result indicating successful authentication is received, the print application 2212 starts executing the printing job regarding the printing data (step S216), and transmits a response indicating complete reception of the printing data to the transmission source (storage print application 2221) of the printing data transmitted in step S213 (step S217).

Upon receiving the response indicating complete reception of the printing data, the storage print application 2221 transmits information indicating successful transmission of the printing data to the print application 2212 and the session ID received in step S212 to the log management unit 126 of the business base server 10a (step S221). Additionally, in a case where the response indicating complete reception of the printing data is not received due to time-out, the storage print application 2221 transmits information indicating transmission failure of the printing data and the session ID to the log management unit 126.

Upon receiving the information indicating successful transmission or transmission failure of the printing data (hereinafter referred to as "transmission result"), the log management unit 126 of the business base server 10a acquires the object job information associated with the session ID that has been received with the transmission result from the job information storage unit 131 (step S222). Then, the log management unit 126 transmits the acquired object job information, the transmission result received in step S221, and the session ID to the management server 40 (step S223).

The log unification unit 41 of the management server 40 stores the object job information, the transmission result, and the session ID in the unified log storage unit 42, which are associated with each other. Additionally, the session ID may be duplicated because the session ID is generated on a business base server 10-by-business base server 10 basis. Therefore, in the unified log storage unit 42, identification information of the business base server 10a that is a transmission source of the object job information, etc., may be stored associated with the object job information, the transmission result, and the session ID. Alternatively, uniqueness of the session ID may be achieved by forming the session ID in a manner such that the identification information of respective business base servers 10 is included as a part of the session ID. In the following, a case where the session ID is formed in the above described manner will be described.

In a case where the deletion flag is "True", the job information management unit 124 of the business base server 10a deletes the object job information from the job information storage unit 131, and deletes the printing data corresponding to the object job information from the data storage unit 132 (step S224).

Then, the print application 2212 reports the authentication code of the printing job and information (hereinafter referred to as "job result information"), indicating the execution result of the printing job, to the extended authentication application 2222 (step S231) upon execution of the printing job controlled by the print application 2212 being successfully performed or being terminated due to abnormality in the image forming apparatus 20a. The authentication code of the printing job means the authentication code authenticated in step S214 and S215. Additionally, for example, similar to the authentication request in step S214, the authentication code and the job result information are also reported to the extended authentication application 2222 via the control service 225 and the SDK platform 223.

The extended authentication application 2222 transmits the session ID stored and associated with the reported authentication code and the reported job result information to the log unification unit 41 of the management server 40 (step S232). The log unification unit 41 stores, in the unified log storage unit 42, the received job result information associated with the object job information that is stored in the unified log storage unit 42 and associated with the received session ID (step S233).

Additionally, the job information and the job result information may be unified by the business base server 10a. In this case, the log management unit 126 of the business base server 10a does not perform the process of step S223. Also, the object job information is not deleted in (at timing of) step S224. Further, the extended authentication application 2222 transmits the session ID and the job result information to the log management unit 126 of the business base server 10a in step S232. The log management unit 126 unifies the object job information stored in the job information storage unit 131 and associated with the session ID and the received job result information, and thereby transmits the unified result to the log unification unit 41 of the management server 40. Then, the object job information is deleted from the job information storage unit 131, and the printing data corresponding to the object job information is deleted from the data storage unit 132 in a case where the deletion flag of the object job information is "True".

Also, functions of the management server 40 may be provided by the business base server 10a. That is, log information may be managed on a business base-by-business base basis.

As described above, according to the present embodiment, an identical session ID is assigned to the information regarding the printing data managed in the business base server 10 and to the information regarding execution of the printing data in the image forming apparatus 20. Consequently, the respective information can be associated based on the session ID.

Additionally, in the present embodiment, although the printing data is described as example data to be processed and output by an apparatus, other types of data and other types of apparatuses may be used in an embodiment as long as the data can be stored in a storage device and retrieved from the storage device by the apparatus. For example, an embodiment may be applied to a projector and image data projected by the projector.

Additionally, the image forming apparatus 20 is an example data processing apparatus in the present embodiment. The business base server 10, the management server 40, the business base server, and the management server are respectively an example of information processing apparatus. The data management unit 125 is an example first generation unit, first storage processing unit, first reception unit, and first transmission unit. The log management unit 126 or the log unification unit 41 is an example of second storage processing unit. The session ID is example first identification information. The authentication code is an example of second identification information.

The extended print application is an example of second reception unit. The extended authentication application 2222 is an example of second generation unit and second transmission unit. The print application 2212 is an example of execution unit.

Herein above, although the present disclosure has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. The present application claims priority under 35 U.S.C. §119 to Japanese Patent Application No. 2015-143727 filed on Jul. 21, 2015. The contents of which are incorporated herein by reference in their entirety.

What is claimed is:

1. An information processing system comprising a plurality of data processing apparatuses and an information processing apparatus for storing data processed by the plurality of data processing apparatuses, the information processing apparatus including:
a first processor; and
a first hardware memory containing first instructions, which when executed, cause the first processor to:
generate first identification information in response to receiving an acquisition request of first data from a data processing apparatus among the plurality of data processing apparatuses, wherein the first identification information is unique to a process corresponding to the received acquisition request;
store the first identification information associated with a process information item, wherein the process information item relates to the first data and is stored in the information processing apparatus;
receive second identification information from the data processing apparatus, wherein the second identification information is generated by the data processing apparatus on a process-by-process basis, and wherein the data processing apparatus transmits the second identification information in response to an acquisition request from the information processing apparatus;
add the second identification information received by the information processing apparatus to the first data, thereby transmitting the first data to the data processing apparatus; and
store an execution information item related to the process performed on the first data by the data processing apparatus in response to receiving the execution information item with the first identification information, wherein the stored execution information item is associated with the process information item that is associated with the first identification information;

the data processing apparatus including:
a second processor; and
a second hardware memory containing second instructions, which when executed, cause the second processor to:
receive the first data, transmitted from the information processing apparatus, wherein the information processing apparatus transmits the first data in response to the acquisition request of the first data from the data processing apparatus;
generate the second identification information in response to the acquisition request of the second identification information from the information processing apparatus, thereby transmitting the second identification information to the information processing apparatus, wherein the generated second identification information is stored and associated with the first identification information that is received with the acquisition request of the second identification information;
perform the process on the first data in response to receiving the first data; and
transmit the first identification information, with the execution information item, to the information processing apparatus in response to performing the process on the first data, wherein the transmitted first identification information is associated with the second identification information that is added to the first data received from the information processing apparatus.

2. The information processing system according to claim 1, wherein the second instructions, when executed, cause the second processor to perform the process on the first data upon detecting that the second identification information that is added to the first data is stored and associated with the first identification information.

3. The information processing system according to claim 2, wherein the data processing apparatus includes an interface for receiving the data via a network, and the second instructions, when executed, cause the second processor to perform the process on the data received via the interface, and transmit the received first data via the interface.

4. An information processing method of information processing system that includes a plurality of data processing apparatuses and an information processing apparatus for storing data processed by the plurality of data processing apparatuses, the information processing method comprising:
generating, by a hardware processor of the information processing apparatus, first identification information in response to receiving an acquisition request of first data from a data processing apparatus among the plurality of data processing apparatuses, wherein the first identification information is unique to a process corresponding to the received acquisition request;
storing, by the hardware processor of the information processing apparatus, the generated first identification information associated with a process information item, wherein the process information item relates to the first data and stored in the information processing apparatus;
receiving, by the hardware processor of the information processing apparatus, second identification information from the data processing apparatus, wherein the second identification information is generated by the data processing apparatus on a process-by-process basis, and wherein the data processing apparatus transmits the second identification information in response to an acquisition request from the information processing apparatus;
adding, by the hardware processor of the information processing apparatus, the received second identification information to the first data, thereby transmitting the first data to the data processing apparatus;
storing, by the hardware processor of the information processing apparatus, an execution information item related to the process performed on the first data by the data processing apparatus in response to receiving the execution information item with the first identification information, wherein the stored execution information item is associated with the process information item that is associated with the first identification information;
receiving, by a hardware processor of the data processing apparatus, the first data transmitted from the information processing apparatus, wherein the information processing apparatus transmits the first data in response to the acquisition request of the first data from the data processing apparatus;
generating, by the hardware processor of the data processing apparatus, the second identification information in response to the acquisition request of the second identification information from the information processing apparatus, thereby transmitting the second identification information to the information processing apparatus, wherein the generated second identification information is stored and associated with the first identification information that is received with the acquisition request of the second identification information;

performing, by the hardware processor of the data processing apparatus, the process on the first data in response to receiving the first data; and transmitting, by the hardware processor of the data processing apparatus, the first identification information with the execution information item to the information processing apparatus in response to the process being performed on the first data, wherein the transmitted first identification information is associated with the second identification information that is added to the first data received from the information processing apparatus.

5. The information processing method according to claim 4, wherein, in the performing, the process is performed on the first data upon detecting that the second identification information that is added to the first data is stored and associated with the first identification information.

6. The information processing method according to claim 5, in the performing, the process is performed on the data received via an interface for receiving the data via a network.

7. A non-transitory recording medium having stored therein a first program for causing a computer to serve as an information processing apparatus for storing data processed by a plurality of data processing apparatuses and a second program for causing a computer to serve as a data processing apparatus among the plurality of the data processing apparatuses, wherein the first program, when executed, causes a hardware processor of the information processing apparatus to perform a method comprising:

generating first identification information in response to receiving an acquisition request of first data from a data processing apparatus among the plurality of data processing apparatuses, wherein the first identification information is unique to a process corresponding to the received acquisition request;

storing the generated first identification information associated with a process information item, wherein the process information item is related to the first data and stored in the information processing apparatus;

receiving second identification information from the data processing apparatus, wherein the second identification information is generated by the data processing apparatus on a process-by-process basis, and wherein the data processing apparatus transmits the second identification information in response to an acquisition request from the information processing apparatus;

adding the received second identification information to the first data, thereby transmitting the first data to the data processing apparatus; and storing an execution information item related to the process performed on the first data by the data processing apparatus in response to receiving the execution information item with the first identification information, wherein the stored execution information item is associated with the process information item that is associated with the first identification information;

and wherein the second program, when executed, causes a hardware processor of the data processing apparatus to perform a method comprising:

receiving the first data transmitted from the information processing apparatus, wherein the information processing apparatus transmits the first data in response to the acquisition request of the first data from the data processing apparatus;

generating the second identification information in response to the acquisition request of the second identification information from the information processing apparatus, thereby transmitting the second identification information to the information processing apparatus, wherein the generated second identification information is stored and associated with the first identification information that is received with the acquisition request of the second identification information;

performing the process on the first data in response to receiving the first data; and transmitting the first identification information with the execution information item to the information processing apparatus in response to the process being performed on the first data, wherein the transmitted first identification information is associated with the second identification information that is added to the first data received from the information processing apparatus.

* * * * *